(12) United States Patent
Govil

(10) Patent No.: US 9,020,824 B1
(45) Date of Patent: Apr. 28, 2015

(54) USING NATURAL LANGUAGE PROCESSING TO GENERATE DYNAMIC CONTENT

(75) Inventor: Aman Govil, San Francisco, CA (US)

(73) Assignee: Google Inc., Mountain View, CA (US)

( * ) Notice: Subject to any disclaimer, the term of this patent is extended or adjusted under 35 U.S.C. 154(b) by 264 days.

(21) Appl. No.: 13/417,148

(22) Filed: Mar. 9, 2012

(51) Int. Cl.
*G10L 21/00* (2013.01)
*G10L 19/04* (2013.01)

(52) U.S. Cl.
CPC ..................................... *G10L 19/04* (2013.01)

(58) Field of Classification Search
CPC ..... G05F 17/27; G05F 17/2785; G10L 14/22; G10L 21/06
USPC ........... 704/9, 231, 257, 270, 270.1, 275, 276
See application file for complete search history.

(56) References Cited

U.S. PATENT DOCUMENTS

| | | | | |
|---|---|---|---|---|
| 5,890,123 | A * | 3/1999 | Brown et al. | 704/270.1 |
| 6,816,858 | B1 * | 11/2004 | Coden et al. | 707/750 |
| 6,988,071 | B1 * | 1/2006 | Gazdzinski | 704/275 |
| 7,010,479 | B2 | 3/2006 | Murata et al. | |
| 7,409,337 | B1 | 8/2008 | Potter et al. | |
| 7,647,254 | B2 | 1/2010 | Cool | |
| 8,335,830 | B2 * | 12/2012 | Jablokov et al. | 709/206 |
| 2005/0027539 | A1 * | 2/2005 | Weber et al. | 704/275 |
| 2008/0235023 | A1 * | 9/2008 | Kennewick et al. | 704/257 |
| 2009/0254455 | A1 * | 10/2009 | Rothey et al. | 705/27 |
| 2009/0326947 | A1 * | 12/2009 | Arnold et al. | 704/257 |
| 2010/0211605 | A1 * | 8/2010 | Ray | 707/780 |
| 2010/0286985 | A1 * | 11/2010 | Kennewick et al. | 704/257 |
| 2010/0318357 | A1 * | 12/2010 | Istvan et al. | 704/251 |
| 2010/0333163 | A1 * | 12/2010 | Daly | 725/133 |
| 2011/0119125 | A1 * | 5/2011 | Javangula et al. | 705/14.43 |
| 2011/0123004 | A1 * | 5/2011 | Chang et al. | 379/88.01 |
| 2011/0258560 | A1 * | 10/2011 | Mercuri et al. | 715/753 |
| 2011/0282651 | A1 * | 11/2011 | Nygaard et al. | 704/9 |
| 2012/0163770 | A1 * | 6/2012 | Kaiser et al. | 386/241 |
| 2012/0290289 | A1 * | 11/2012 | Manera et al. | 704/9 |

FOREIGN PATENT DOCUMENTS

JP          9167165          6/1997

* cited by examiner

*Primary Examiner* — Douglas Godbold
(74) *Attorney, Agent, or Firm* — John D. Lanza; Foley & Lardner LLP

(57) ABSTRACT

Apparatus and method for using natural language processing (NLP) to generate dynamic content, such as but not limited to an audio/visual (A/V) presentation. In accordance with some embodiments, a language analysis module is adapted to analyze a data signal received into a memory. The data signal is generated responsive to an input sequence expressed in a natural language format by a user of a network accessible device. A database of informational segments is stored in a memory, and a compositing engine is adapted to generate an on-the-fly presentation from selected segments in the database and to transmit the presentation as a unique display sequence for the user responsive to the input text sequence.

20 Claims, 5 Drawing Sheets

POSITIVE SCRIPT

STANDARD QUESTIONS
What's your name? – Katy  M/F? - F
Where did you rent? – Mountain View, California
What did you rent? – BMW 328i
Do you remember who helped you at XYZ Rental? – Y
Name? – Romeo  M/F? – M
Did you have a positive experience with XYZ? - Y
— 400

NATURAL LANGUAGE QUESTIONS
What did XYZ Rental do to make your experience great?
- Natural language response with keywords "lost," "returned" and "dinosaur"
— 402

FOLLOW UP QUESTION
How did XYZ Rental return the lost item?
- Natural language response with keyword "mailed"
— 404

SEGMENT DURATION (TIME) → 406

| SEGMENT | |
|---|---|
| 1 | Every customer letter helps us learn how we can do better. — 408 |
| 2 | Like this one from Katy. |
| 3 | After stopping at one of our branches in Mountain View, |
| 4 | she realized she'd misplaced a |
| 5 | cuddly dinosaur. |
| 6 | Was it in the glove box? Under the seat? Behind the bathroom sink? |
| 7 | Romeo, the XYZ Rental rep on duty |
| 8 | was happy to help, searching high and low until he found the item and |
| 9 | mailed it back to where it belonged. |
| 10 | At XYZ Rentals, we go the extra mile for you. Because we care. |

FIG. 4

NEGATIVE SCRIPT

STANDARD QUESTIONS
What's your name? – Jarrett    M/F? - M
Where did you rent? – Norfolk, Virginia
What did you rent? – Ford Mustang
Do you remember who helped you at XYZ Rental? – Y
Name? – Emily             M/F? – F
Did you have a positive experience with XYZ? - N
— 500

NATURAL LANGUAGE QUESTIONS
What was disappointing about your experience?
- Natural language response with keywords "bad," "customer" and "service"
— 502

SEGMENT DURATION (TIME) — 506

| SEGMENT | |
|---|---|
| 1 | XYZ Rental depends on customer feedback. Even when things go wrong. |
| 2 | Like this from Jarrett. |
| 3 | After visiting our branch in Norfolk,  508 |
| 4 | we were disappointed to hear that he experienced bad customer service. |
| 5 | We are thankful for the feedback. |
| 6 | Because at XYZ, we take customer service seriously. |
| 7 | And every time you come to XYZ, we start over trying to prove ourselves. |
| 8 | So we'd like to get in touch with Jarrett and resolve the issue |
| 9 | and show him that every one of us is committed to getting it right. |
| 10 | We are XYZ Rentals. We really want to be your rental company. |

FIG. 5

USING NATURAL LANGUAGE PROCESSING TO GENERATE DYNAMIC CONTENT

BACKGROUND

Natural language processing (NLP) generally refers to the interaction of a user with a computerized system through inputs supplied by the user in a natural language (e.g., human structured syntax as opposed to computer or machine language syntax).

NLP systems are used in a variety of applications such as in the area of database management. Instead of requiring a user to present a query in a structured logical form, an NLP interface allows the user to type in (or speak) a phrase specifying the requested information. An internal translation engine will convert the input to a form that can be interpreted and processed by the machine logic, allowing the requested query results to be returned from the database to the user.

SUMMARY

Various embodiments of the present disclosure are generally directed to an apparatus and method for using natural language processing (NLP) to generate dynamic content, such as but not limited to an audio/visual (A/V) presentation.

In accordance with some embodiments, a language analysis module is adapted to analyze a data signal received into a memory. The data signal is generated responsive to an input sequence expressed in a natural language format by a user of a network accessible device. A database of informational segments is stored in a memory, and a compositing engine is adapted to generate an on-the-fly presentation from selected segments in the database and to transmit the presentation as a unique display sequence for the user responsive to the input text sequence.

These and other features and advantages of various embodiments can be understood from a review of the following detailed description section and the accompanying drawings.

BRIEF DESCRIPTION OF DRAWINGS

FIG. 4 illustrates operation of the routine of FIG. 3 to generate an output A/V sequence responsive to a positive input by the user.

FIG. 5 correspondingly illustrates operation of the routine of FIG. 3 to generate an output A/V sequence responsive to a negative input by the user.

DETAILED DISCUSSION

The present disclosure generally relates to natural language processing (NLP), and more particularly to the dynamic generation of content responsive to a natural language input by a user.

Mobile advertisements (ads) often take a relatively structured form. A company desiring to generate an ad campaign based on customer feedback may hire an advertising agency to sort through and select representative customer communications. From these representative communications the agency creates, from story-board to finished product, a polished A/V presentation suitable for cable, airwave and/or network (e.g., Internet, broadband, etc.) broadcast. While operable, this approach can be relatively costly and time consuming, and can result in relatively few new ads being produced for the company over a given period of time.

Accordingly, various embodiments of the present disclosure are generally directed to an apparatus and method for dynamically generating content responsive to a natural language input by a user. Without limitation, in some embodiments the content is a unique production-quality video with associated audio tracks suitable for use in a targeted or nationwide advertising campaign. The content may be in the form of an animated video or a non-animated (real life footage) video. The content can be generated in real-time based on a simple questionnaire which is filled out by a customer of the company. In this way, a company can have a large variety of new and interesting ads based on real life experiences of recent users of the company's products or services.

While some embodiments discussed below generate A/V content, this is merely illustrative and not necessarily limiting. The various techniques can be adapted for other forms of output content, such as but not limited to the execution and confirmation of a transaction between the user and the company based on a user's natural language input.

Figure 1:
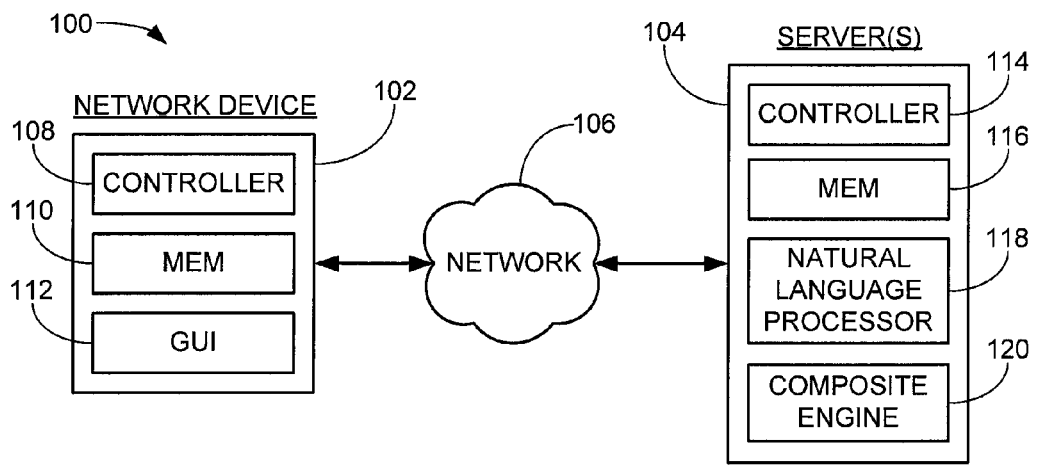
FIG. 1 provides a functional block diagram for a dynamic content generation system in accordance with some embodiments.

These and other features and benefits can be understood beginning with a review of FIG. 1 which depicts a dynamic content generation system 100 in accordance with some embodiments. The system includes a number of components including a network accessible device 102 and one or more servers 104. The device 102 and server(s) communicate over a network 106, such as a wide area network (WAN), a local area network (LAN), a broadband wireless network, etc.

The network accessible device 102 can take a variety of forms, including but not limited to a desktop computer, a laptop computer, a tablet, a smart phone or some other network accessible appliance adapted to receive and display A/V content. The device 102 is shown to include a controller 108, local memory (mem) 110 and a graphical user interface (GUI) 112. The controller 108 may be a hardware based or programmable processor which provides top level control of the device responsive to inputs supplied by a user of the device via the GUI 112. The device memory 110 stores information input by the user, programming and/or control information utilized by the controller 108, and information transferred to the device over the network 106. The GUI 112 may include a keyboard, keypad, mouse, monitor, touch screen, touch pad, microphone, and/or other suitable components to enable human comprehensible interaction with and/or control of the device.

The server 104 can similarly take a variety of forms, and is shown in FIG. 1 to include a controller 114, server memory (mem) 116, a natural language processor module 118 and a composite engine 120. While only a single network accessible device 102 and a single server 104 are shown in FIG. 1, it will be appreciated that any number of respective devices and servers can be interconnected and utilized in accordance with the present disclosure. As explained below, a user of the device 102 can access the server 104 to generate dynamic content responsive to a natural language input to the device by the user. The content is returned to the user for display on the device 102, or to a different device.

Figure 2:
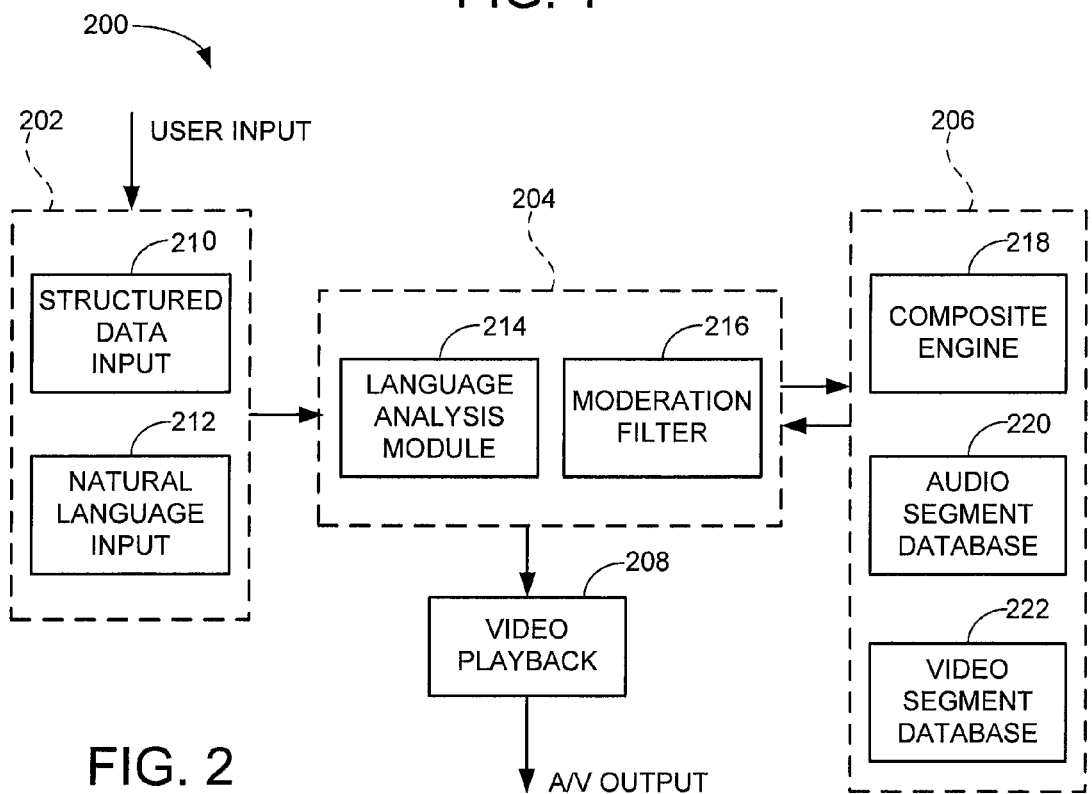
FIG. 2 illustrates various aspects of the system of FIG. 1.

FIG. 2 illustrates a processing system 200 that can be incorporated into the system 100 of FIG. 1. The processing system 200 includes an interface module 202, a web server module 204, a rendering module 206 and a video playback display 208. Other arrangements can be utilized.

The interface module 202 includes a structured data input block 210 and a natural language input block 212. These respective blocks 210 and 212, as well as the video playback display 208, may correspond to the GUI 112 (FIG. 1) and facilitate the inputting of data by the user as well as the subsequent display of the generated content to the user. In some embodiments, the input modules 210, 212 may be transferred to the user device memory 110 in response to the user accessing a web page from the server 102. In other embodiments, the modules may be local application programming (an "app") stored on the user device 102 and accessed by the user as desired.

In some embodiments, the input modules 210, 212 receive natural language input from the user in the form of typed text as the user fills out a questionnaire. Other forms of natural language input are envisioned, including but not limited to voice recognition, handwriting recognition and optical character recognition (OCR). The modules may further be adapted to receive and interpret so-called "text" style shorthand inputs.

The web server module 204 includes a language analysis module 214 and a moderation filter 216. As explained below, these modules process the structured and natural language inputs from the interface module 202 and, as necessary, filter or otherwise moderate inappropriate language entered by the user. The language analysis module 214 may access a number of sources in parsing both the standard and natural language inputs, including but not limited to Roget's Thesaurus, Wordnet, Wikipedia, etc. Alternatively or additionally, custom dictionaries and databases can be generated. The moderation filter 216 may include programmed moderation based on the detection of a specified list of unacceptable words, and may also utilize human moderation in a supervisory context to ensure the appropriateness of the generated content prior to delivery. The moderation filter may operate to both moderate inputs supplied to the rendering server 206 as well as moderate the finished content from the rendering server prior to display.

The rendering module 206 includes a composite engine, an audio segment database 220 and a corresponding video segment database 222. The composite engine may be a hardware or software based engine that, responsive to the language analysis module 214 and the moderation filter 216, selects appropriate segments from the respective databases 220, 222 to generate the final content. The respective databases are stored in an appropriate memory location to facilitate ready access by the engine. In some embodiments, cloud-based rendering may be performed.

While the generated content can be delivered to the user for local display on the device 102, in further embodiments other display outlets may be used, such as the display of user-approved videos on public forum websites (e.g., Youtube, etc.). In some embodiments, the audio and video segments each comprise relatively short clips, such as from 1-5 seconds each, with each clip depicting a different scene. It is contemplated that the video segments will be animated with a relatively high production value from a professional studio, although such is not necessarily required. The audio segments may include voiceovers, theme music, sound effects and/or other audio information appropriate for the corresponding video segments. Any suitable human language can be used (e.g., English, etc.)

The video segments may be formatted in accordance with a suitable codex standard, such as MPEG-4 (Moving Pictures Equipment Group) encoding, and arranged as a sequence of frames arranged for display at a selected frame rate (e.g., 24 frames/sec). The frames will be expressed as an array of pixels, such as in RGB or YUV format.

The audio and video segments are pre-generated prior to use of the system 200. In some embodiments, an empirical study of a population of customer communications can be undertaken to thematically break down the different communications into a manageable number of categories (scenarios). From these categories, individual video and audio segments can be grouped together to describe each scenario. While an animated presentation in the form of a company advertisement is provided by the system, other presentation formats can be generated including still pictures and images, audio sequences, etc.

To provide an illustrative example, assume a database of segments is generated for a hypothetical car rental company referred to herein as the "XYZ Rental" car company. Suitable animated scenes for the database may include a variety of vehicles (either still or shown driving down the road), airports, service counters, generic female/male customers, generic female/male customer service representatives, various items (e.g., laptop computers, stuffed toys, etc.), outside shots of clouds, birds, mountains, beaches, etc., action shots of individuals performing various tasks, a representation of a company facility, a shot of the company logo, and so on. This permits a very large population of individual, unique stories to be told by assembling different segments into a given presentation. Sufficient redundancy is provided such that different scenes and audio samples can be selected for customers reporting similar stories, so that every presentation can be uniquely tailored for each user.

The segments can be arranged into presentations on the order of about 30 seconds in length, although shorter or longer presentations can readily be generated as desired. The presentations can be part of an advertising campaign for the XYZ Rental company and subsequently broadcast to potential and existing customers of the company.

Figure 3:
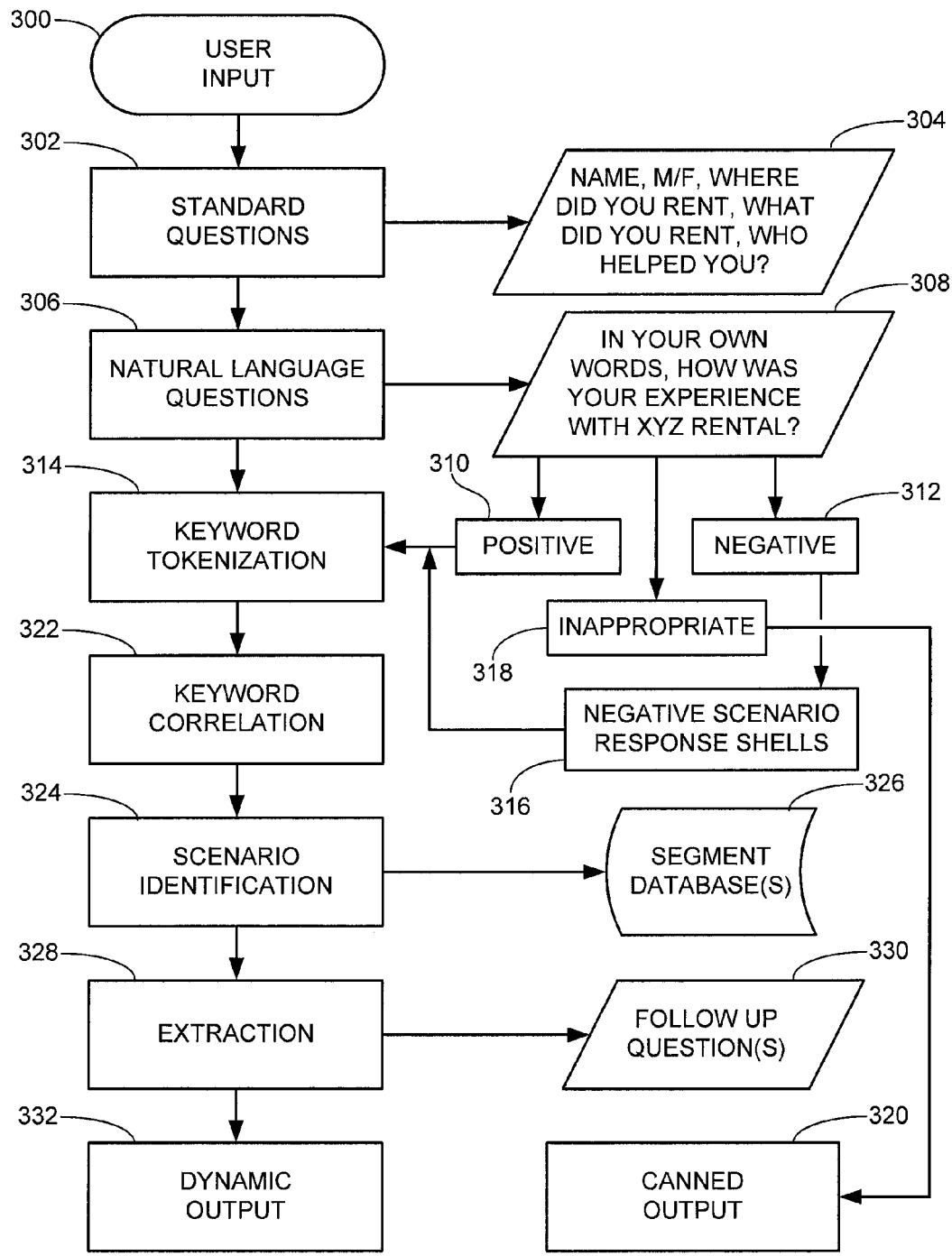
FIG. 3 is a flow chart for a routine generally illustrative of steps carried out in accordance with some embodiments to dynamically generate content responsive to a natural language input by a user.

FIG. 3 provides a flow chart for a USER INPUT routine 300, generally illustrative of steps that can be taken by the systems shown in FIGS. 1-2 to generate dynamic content. FIG. 3 will be discussed in the context of queries presented to a customer of XYZ Rental at the conclusion of the customer's renting of an automobile from the company in order to obtain customer feedback. An invitation to participate in the feedback program may be communicated to the user in a variety of ways, such as via a web browser, an email communication, a text message, etc.

A series of standard questions are initially presented to the customer at step 302. These are depicted in box 304 as a sequence of short yes/no and fill-in-the-blank queries where the resulting answers are structured to fit within predetermined format and content constraints. Standard questions may include such queries as "What's your name?", "are you male or female?", "where did you rent your car?", "what kind of car did you rent?", "do you remember the name of the customer service representative who helped you?", "if so, what was their name?", "was he male or female?", and "did you have a positive experience with us?".

It will be appreciated that other types and numbers of questions can be posed to the user at this time. The right side of the routine in FIG. 3 can thus be tailored significantly depending on the soliciting company/organization and types of stories to be generated. The answers supplied by the user enable the language analysis module (214, FIG. 2) to generate a clear picture of what story is being communicated, with adequate detail to make it unique to the customer's experience.

By way of example, identifying whether the customer service representative (if any) was male or female will enable the selection of an appropriate gender for a company service representative depicted in the final presentation. The name of the representative can be added to a blank name tag on the representative's clothing or counter name plate, thereby further tailoring the presentation to the customer's actual experience. Further levels of detail can be obtained through the use of additional questions; for example, if the standard questions inquire as to the color of the car that was rented, this information can be depicted in the final presentation as well.

It should be noted that standard questions are not necessarily required, although such serve to populate the presentation with useful information. Such information could be alternatively gleaned from the natural language input. Indeed, the natural language input need merely be provided in some way, and not necessarily in response to a question for the user to answer.

The system may be configured to accommodate multiple language options (e.g., English, French, Mandarin, etc.). In such case, the user may be offered an opportunity to provide both standard language inputs and natural language inputs in a selected language. This capability is based on the observation that a customer may be more comfortable speaking/typing in her native dialect (e.g., Russian), even if she wishes to receive the output in a different language (e.g., English). The system can be configured to address these and various other considerations.

Continuing with the flow of FIG. 3, step 306 presents one or more natural language questions to the user. One question, as generally depicted by block 308, may be something along the lines of, "in your own words, please tell us about how your experience with XYZ rental was great?" This is intended to be typed, spoken or otherwise conveyed by the user into an appropriate field in the user interface. A suitable typed character limit, such as 140 characters, may be imposed to ensure brevity and enhance the substantive content of the natural text.

In some embodiments, one of the standard questions asked of the user may be to affirmatively indicate whether the experience was positive or not. If so, the natural language question will follow; otherwise, the natural language question can be skipped. In other embodiments, the language analysis processor can attempt to determine from the natural language input by the user whether the overall experience was positive or negative. These respective options are denoted by respective blocks 310 and 312.

If the response was indicated as being positive (either expressly or via implication from the natural language context), the routine continues to step 314 in which the language analysis module performs keyword tokenization processing. This can be carried out in a variety of ways depending on the requirements of a given application and the structure of the segment database. It is contemplated that this processing will include the selection and evaluation of various words, both individually and in context, to arrive at a basic understanding of what was being communicated. A more concrete example of the processing that may be performed responsive to a positive scenario will be discussed below.

Should the response be found negative, the flow passes from block 312 to block 316. In block 316, certain preselected negative scenario response shells are invoked. These shells may be designed to express disappointment and concern about the experience and may incorporate some of the answers to the standard questions and, as desired, information from any natural language input. As before, a more concrete example of the processing that may be performed responsive to a negative scenario will be discussed below.

As will be appreciated, any time that a system allows users to enter natural language into a query field, it is possible that some segment of the population will be tempted to enter an inappropriate response. This is depicted by block 318. Responses may be inappropriate for any number of reasons, such as due to the inclusion of sexual innuendo, threatened violence, libelous text, or even simply unintelligible statements. When inappropriate content is supplied, the detection of such can be made by the moderation filter 216 (FIG. 2), and an appropriate pre-defined, canned output can be generated as shown by step 320.

Continuing with the flow of FIG. 3, the processing continues at step 322 in which keyword correlation processing takes place. This step takes the output from the tokenization step 320 and attempts to put together a sequence that conveys the information entered by the user. In some embodiments, the correlation processing can be output to the composite engine (218, FIG. 2), which operates to perform a scenario identification at step 324. The engine accesses the various segment database(s) (block 326) to identify appropriate scenes to depict the identified scenario in view of the associated input information.

It has been found that, while customer feedback (or other populations of communications) can each be unique, it is often possible to sort these types of communications into a relatively few number of scenarios. For example, in the context of a rental car company there may be a variety of feedback communications in which the customer left an item (a briefcase/file/purse/toy/computer/phone/etc.) in the rental car, and the item was returned to the customer by being shipped/mailed/hand delivered/etc. Another common scenario might be a case where a customer had a delayed flight and a customer service representative performed some act of kindness such as staying late/providing a cup of coffee/obtaining an upgrade for the customer/etc. Accordingly, step 324 can involve an attempt to classify the correlation results into one (or more) potential scenarios.

An extraction step 328 next retrieves and assembles the associated scenes to match the identified scenario. If there is insufficient information for the system to identify an exact scenario that has been described by the user's natural language input, one or more follow up questions (block 330) may be posed to the user at this time. The format of the answers supplied by the user to the follow up questions may be in either standard format or natural language format. The answers supplied by the user will be processed by the language analysis module as before and the process will repeat until a final scenario can be satisfactorily identified to a reasonable level of confidence.

At this point, the individual audio and video segments are selected, modified as required to tailor the presentation to the identified story, and stitched together to provide the final dynamic output as shown at step 332. Depending on the configuration of the system, the entire elapsed time through the routine from initial data input to the commencement of the video presentation display may be on the order of 1-2 minutes or less.

The lack of sufficient information to generate the final presentation can be detected by the system in a variety of ways, including through empirical heuristics or confidence levels generated by the language processor and/or compositing engine. In some cases, it may not be clear exactly what happened from the detected keywords. In other cases, the story may be reasonably clear but simply incomplete, as a final resolution of the story cannot be adequately determined. The follow up questions can be used in an effort to resolve this situation. In some cases, multiple questions may be successively posed before sufficient confidence is achieved.

The follow up questions can be used to clarify the input text in situations where the language analysis module did not recognize an input word. This may arise for a variety of reasons such as due to a misspelling of the word, or due to the word not appearing in the existing dictionary databases or other reference materials used by the module. A related situation may arise when an input word is recognized by the system, but the meaning is ambiguous. A word might have multiple meanings and the actual meaning implied by the user may not necessarily arise from the context. In such cases, a follow up question might be as simple as "what did you mean by (word)?" or a similar query.

FIG. 4 shows a sequence through the routine of FIG. 3 for a particular case in which the customer had a positive experience with the company. Block 400 shows a sequence of standard questions and the associated answers entered by the customer.

Block 402 shows a corresponding natural language question that was supplied to the customer after the customer completed the standard questions. Although not separately indicated in FIG. 4, it will be understood that the customer told the story in natural language along the lines that she had left a toy dinosaur in the rental car. Upon discovering this, she called the company and a customer representative returned it to her.

This natural language text enabled the language processor to identify certain keywords such as "lost," "returned" and "dinosaur." This was sufficient to enable the system to determine that this fell into the "lost item" scenario. Since the customer reported that the overall experience was positive, the system further presumed that the item was somehow returned by a customer representative. What remained unknown was how exactly the dinosaur was returned. This was addressed by a follow up question in block 404 which asked the customer how was the dinosaur returned to her? The customer supplied a natural language response which informed the system that the toy was mailed to the customer. This enabled the language processor to add the keyword "mailed" to the tokenization listing.

With this information, the routine of FIG. 3 resulted in the generation of a user-specific A/V presentation 406 made up of a sequence of variable length informational segments 408. The segments are denoted as Segments 1-10, and are stitched together in order so that Segment 1 is displayed first, immediately followed by Segment 2 and so on through the final Segment 10.

The length of each segment 408 in FIG. 4 denotes its relative duration, and the text in each segment box indicates the voice-over audio. It will be appreciated that appropriate video frames are displayed during each segment that are associated with the corresponding audio, but such are not depicted in FIG. 4. For example, Segment 2 might provide an animated shot of a generic female customer; Segment 3 might be an animation outside shot of a car pulling up to a representation of the XYZ rental company facility with mountains in the background; Segment 6 might show the customer frantically looking for the lost item, and so on.

Multiple alternative video segments can be provided in the database to convey each of the different scenes in the presentation. The selection of individual segments when stitching together a particular presentation can take place in a variety of ways, such as through a round-robin approach among multiple candidates. These techniques further help to ensure that each presentation is likely unique.

FIG. 5 provides a corresponding script for a case where the customer had a negative experience. A series of standard questions were asked at block 500, and a natural language question was asked at block 502. In this embodiment, the natural language question was selected in response to the answer by the question to one of the standard questions; that is, because the customer indicated that his experience was negative, the natural language question inquired as to what was disappointing about the service, rather than (inappropriately) asking what was great about the service.

The tokenization operation identified the terms "bad," "customer" and "service" which are relatively simple to contextualize. Additional follow up questions could have been submitted if further clarification was needed.

An associated presentation 506 was generated in response to these inputs. As before, the presentation 506 was formed from a number of informational segments 508 of variable length, which are identified as Segments 1-10. While both FIGS. 4 and 5 use 10 segments, this is merely for purposes of illustration as each presentation can utilize an appropriate number of segments as necessary to convey the desired information. It can be seen that certain information gleaned from the customer in response to the standard and natural language questions is embedded into the negative response presentation.

Figure 6:
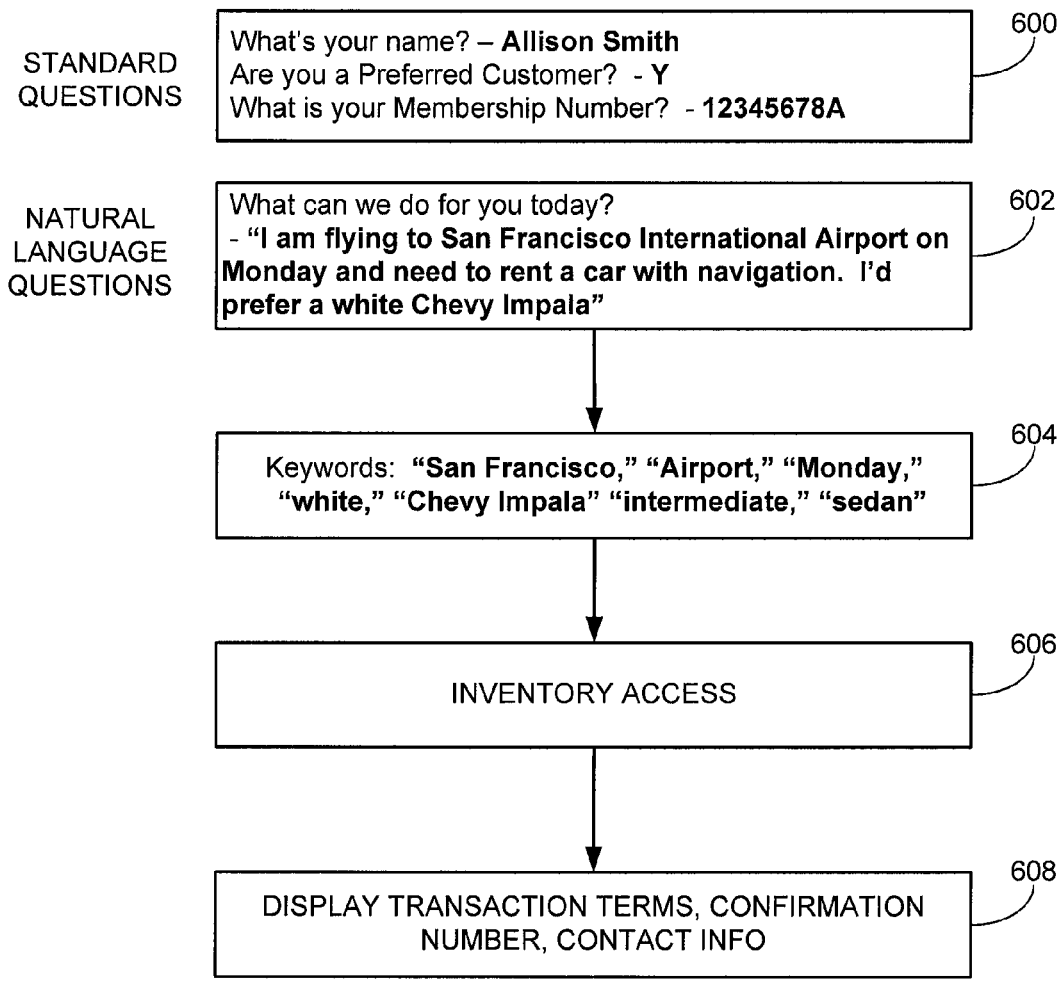
FIG. 6 illustrates an alternative operation of a routine such as set forth by FIG. 3 to generate an output transaction confirmation sequence responsive to natural language input by the user.

While the foregoing embodiments have been generally directed to the generation of an A/V presentation, other alternative forms of dynamic output can be generated. FIG. 6 provides an example transaction script in which the informational segments in one or more databases point to items in a physical inventory. In this case, the dynamic content is a confirmation of a transaction between the user and a company generated in response to a natural language input by the user. With regard to the XYZ Rental car company, the inventory may comprise a fleet of automobiles available for rent, and the informational segments in the database may identify these automobiles as well as other information such as installed options, location, associated rates, background information relating to the customer, and so on.

The transaction can be initiated by the user accessing the web browser 204 in FIG. 2 via a network device such as 102 in FIG. 1, and the web browser returning standard question and natural language modules for data entry by the user in a suitable format (text, voice, handwriting, etc.). A sequence of standard questions are answered by the user in block 600, and a natural language question is answered by the user in block 602.

The natural language question is relatively open ended, permitting the user to identify her needs in a quick and efficient manner. Should follow up questions be required, such can be provided and answered in like fashion.

Keyword tokenization is shown to take place at block 604. It is noted that most of the keywords were derived directly from the natural language input, but some were derived from the context of the natural language. For example, because the customer requested a Chevy Impala, the language analysis module could determine with reasonable confidence that the customer was interested in an intermediate sized sedan. While not shown, modulation filtering can be applied to detect and address inappropriate input.

An inventory access operation is denoted at block 606. This may be carried out by the composite engine searching to assemble a script of appropriate informational segments to complete the transaction. This may include a search of those vehicles meeting the requested parameter at the desired location. It may further include a search of information stored in another database relating to the user's customer number (e.g., billing information, etc.).

A final dynamic content output is represented by block 608 as providing confirmation of the completed transaction, including a confirmation number and contact information. This can be supplied as an immediate fixed image on a video display accessible by the user, or may be transmitted in some other way such as via an informational email.

Intermediate steps may take place as well; for example, the system may propose a specific offer to the customer and, in response to her acceptance (which may also be in natural language format), the output content is generated and displayed.

Irrespective of the type of dynamic content that is generated, the system can be further configured to provide post-display processing. In some embodiments, at the conclusion of the video presentation the user can be given the option to indicate whether he liked the video. A numbered scale (e.g., from one to five stars) can be provided to enable the user to express his preference level. Additionally or alternatively, links can be provided via a social network, allowing the user to "endorse" the video and/or distribute it to his friends.

If the user expresses displeasure with the video presentation (or other form of generated content), follow up questions can be posed to request further information and clarification. In some embodiments, a new, modified presentation may be generated based on this additional input. The user may further check a box allowing the video to be distributed by the company, or a notice to that effect may be displayed so that the user agrees to this prior to the initiation of the process.

Further post-processing can take place at the system level, either automatically or via system administrator intervention. For example, in the case of the hypothetical XYZ Rental company, the database may have segments for all of the company's locations as of a certain date. If the company opens a new location, this may result in the customers identifying a rental location not currently in the database. This can set a flag or other exception report to enable the database to be updated with appropriate segments associated with this new location. Similarly, if words or phrases are used that appear on a regular basis that require clarification by the system, analysis of these trends can lead to either improved automated performance ("learning") by the system, or improvement via system administrator changes to the system.

In further embodiments, the extent to which various video (or other) presentations are received, as rated by the users or the extent to which the presentations are forwarded by the users, can provide feedback information to enable further automated or system administrator initiated improvements. It is believed that these and other steps, in conjunction with the use of benchmarking metrics, statistics and trend detection can be used to improve the system to achieve, over time, a high rate of accuracy in the generated presentations and satisfaction by the system users.

It will be appreciated that the various embodiments disclosed herein may provide a number of benefits. In an advertisement campaign context, the system can generate a large population of uniquely tailored A/V presentations suitable for use in an ad campaign over a network, with the presentations being based on real-life, up-to-date customer experiences. Literally billions of unique, different videos can be generated on-the-fly based on a relatively small storage footprint. This can provide an advertising server with a large population of potential ads that can be concurrently broadcast to different venues.

It is not necessarily required that the finished presentation be stored as an assembled audio/video work, although this can be done as required. Rather, the system allows the use of a very efficient storage mechanism, such as a table in memory, that simply identifies which segments should be played, and in which order, for a given video. Selection of the video thus results in the successive streaming of the right segments in the right order directly out of the database. The quality of the presentations may be sufficient for use in more formal applications including network television commercials.

Any number of different types of dynamic content can be generated, including product testimonials and endorsements, suggestions for improvements, congratulations to a winning team (including excerpting of actual video clips from a recent game), stories, games, news reports, simulations and records of historical events. In some embodiments, the various systems disclosed herein could be adapted to story board a creative concept for a movie, television show or play based on a few keywords entered in a natural language format. That is, by entering a short description of a story line, any number of unique content presentations could be generated for evaluation and use.

Though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
a language analysis module configured to:
receive a natural language input from a user of a network accessible device;
identify a sequence of keywords conveying a message communicated in the natural language input; and
analyze the identified sequence of keywords to identify a scenario among a plurality of scenarios, each of the scenarios representing a category of user messages;
a database of informational segments stored in a memory; and
a compositing engine configured to:
receive the identified sequence of keywords and the scenario identified from the sequence of keywords;
select a plurality of segments in the database based on the received sequence of keywords and the received scenario;
retrieve the selected segments from the database; and
combine the retrieved segments to generate an on-the-fly presentation.

2. The apparatus of claim 1, in which the informational segments in the database comprise variable length video clips of individual scenes so that the generated presentation comprises a video presentation responsive to the natural language, the video presentation made up of the selected segments streamed in a selected order.

3. The apparatus of claim 1, in which the informational segments in the database comprise pointers to items in a physical inventory and the presentation comprises a confirmation of a transaction with the user involving at least one item in the inventory as requested by the input text sequence.

4. The apparatus of claim 1, in which the presentation is a video presentation advertisement depicting a story associated with the message communicated in the natural language input.

5. The apparatus of claim 1, in wherein in identifying and analyzing the sequence of keywords, the language analysis module is configured to perform keyword tokenization and contextualization of the natural language input to provide an output sequence indicative of the scenario to the compositing engine which, in response, selects the segments from the database to provide a video presentation that corresponds to the output sequence.

6. The apparatus of claim 5, further comprising a modulation filter module operationally disposed between the language analysis module and the compositing engine, the modulation filter module adapted to evaluate the output sequence and deny the transmission thereof to the compositing engine responsive to detection of objectionable content therein.

7. The apparatus of claim 6, in which the modulation filter module is further adapted to evaluate the presentation output by the compositing engine and deny the transmission thereof responsive to detection of objectionable content therein.

8. The apparatus of claim 1, in which the network accessible device includes a handheld portable electronic communication device and the user enters the natural language input by typing text or audibly speaking into the device.

9. The apparatus of claim 1, further comprising a standard question input module adapted to receive a first sequence of information from the user responsive to a set of standard language questions, and a natural question input module adapted to receive a second sequence of information from the user responsive to a set of natural language questions, the compositing engine identifying the selected informational segments responsive to the first and second sequences of information from the user.

10. The apparatus of claim 1, in which the presentation comprises an audio/video (A/V) presentation as part of an advertising campaign by an entity which depicts an experience of a customer of the entity, the experience related by the customer in said natural language input.

11. A method comprising:
receiving a natural language input from a user of a network accessible device;
identifying a sequence of keywords conveying a message communicated in the natural language input;
analyzing the identified sequence of keywords to identify a scenario among a plurality of scenarios, each of the scenarios representing a category of user messages;
selecting a plurality of segments in the database based on the sequence of keywords and the scenario;
retrieving the selected segments from the database; and
combining the retrieved segments to generate an on-the-fly presentation.

12. The method of claim 11, in which the presentation comprises an audio/video (A/V) presentation as part of an advertising campaign, the A/V presentation relating to an experience of the user as expressed in the natural language input.

13. The method of claim 11, further comprising broadcasting the presentation as an advertisement for an entity associated with the database.

14. The method of claim 11, in which the informational segments in the database comprise variable length video clips of individual scenes so that the generated presentation comprises a video presentation responsive to the input text sequence, the video presentation made up of the selected segments streamed in a selected order.

15. The method of claim 11, in which the informational segments in the database comprise pointers to items in a physical inventory and the presentation comprises a confirmation of a transaction with the user involving at least one item in the inventory as requested by the input text sequence.

16. The method of claim 11, wherein identifying and analyzing the sequence of keywords comprises keyword tokenization and contextualization of the natural language input to provide an output sequence indicative of the scenario, and filtering of the output sequence for objectionable content.

17. The method of claim 16, in which the generating the presentation comprises filtering the presentation for objectionable content prior to transmission of the presentation over a network.

18. A method comprising:
initiating contact with a customer of an entity;
receiving a natural language input sequence from the customer responsive to a natural language query;
identifying keywords from the natural language input sequence;
contextualizing the identified keywords to identify a scenario from a plurality of scenarios in a memory, each of the scenarios representing a category of customer messages;
accessing a database in a memory to select a plurality of variable length video clips based on the keywords and the scenario;
retrieving the selected video clips from the database; and
combining the retrieved video clips to generate on-the-fly a video presentation.

19. The method of claim 18, further comprising receiving a standard language input sequence from the customer responsive to a standard language query, wherein the keywords are identified from both the natural language input sequence and the standard language input sequence.

20. The method of claim 19, further comprising receiving a follow up natural language input sequence from the customer responsive to an inability to identify a selected scenario responsive to the natural language input sequence, and subsequently identifying the selected scenario responsive to both the natural language input sequence and the follow up natural language input sequence.

* * * * *